(12) United States Patent
Constant et al.

(10) Patent No.: US 6,339,030 B1
(45) Date of Patent: Jan. 15, 2002

(54) FABRICATION OF PHOTONIC BAND GAP MATERIALS

(75) Inventors: Kristen Constant; Ganapathi S. Subramania; Rana Biswas; Kai-Ming Ho, all of Ames, IA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 09/477,191

(22) Filed: Jan. 5, 2000

Related U.S. Application Data
(60) Provisional application No. 60/114,883, filed on Jan. 5, 1999.

(51) Int. Cl.[7] .......................... H01L 21/31; H01L 21/469
(52) U.S. Cl. .......................... 438/758; 438/758; 438/7; 438/16; 438/22; 438/29; 257/9; 257/10; 257/13; 257/76; 257/918
(58) Field of Search .............................. 438/758, 7–29; 257/9–13, 76, 918

(56) References Cited

U.S. PATENT DOCUMENTS

| | | | | |
|---|---|---|---|---|
| 4,078,284 A | * | 3/1978 | Capek et al. | 29/25.35 |
| 5,145,812 A | * | 9/1992 | Arai et al. | 501/97 |
| 5,604,170 A | * | 2/1997 | Sano et al. | 502/115 |
| 5,769,917 A | * | 6/1998 | Belko et al. | 65/17.3 |
| 6,027,826 A | * | 2/2000 | DeRochmont et al. | 428/702 |
| 6,074,983 A | * | 6/2000 | Derolf et al. | 502/407 |
| 6,103,379 A | * | 8/2000 | Margel et al. | 428/403 |

FOREIGN PATENT DOCUMENTS

WO  WO-94/15389  * 7/1994

OTHER PUBLICATIONS

Willander et al. "Recent reseach and progress in photon devices and materials" IEEE PEP 1997 0–7803–3865–0/97 p. 4–13.*

Fink et al. "Block copolymers as photonic bandgap materials" IEEE Journ. of lightwave technology. vol. 17 No. 11 Nov. 1999 p. 1963–1969.*

* cited by examiner

*Primary Examiner*—Matthew Smith
*Assistant Examiner*—Granvill D Lee, Jr.
(74) *Attorney, Agent, or Firm*—Mark F. LaMarre; Thomas G. Anderson; Virginia B. Caress

(57) ABSTRACT

A method for forming a periodic dielectric structure exhibiting photonic band gap effects includes forming a slurry of a nano-crystalline ceramic dielectric or semiconductor material and monodisperse polymer microspheres, depositing a film of the slurry on a substrate, drying the film, and calcining the film to remove the polymer microspheres therefrom. The film may be cold-pressed after drying and prior to calcining. The ceramic dielectric or semiconductor material may be titania, and the polymer microspheres may be polystyrene microspheres.

14 Claims, 5 Drawing Sheets

(2 of 5 Drawing Sheet(s) Filed in Color)

FABRICATION OF PHOTONIC BAND GAP MATERIALS

PRIORITY

This application claims priority from Provisional Application No. 60/114,883 filed on Jan. 5, 1999. This application was filed during the term of the before-mentioned Provisional Application

GRANT REFERENCE

This invention was made with Government support under contracts No. W-7405-Eng-82 (DOE-ISU) awarded by the Department of Energy and No. ITA87-02 (DOC-ISU) awarded by the Department of Commerce. The Government has certain rights in the invention.

FIELD OF THE INVENTION

This invention relates to improved methods for the formation of periodic structures of dielectric material, particularly photonic band gap materials, and to the structures formed by the improved methods.

BACKGROUND OF THE INVENTION

Photonic crystals or photonic band gap materials comprise crystal-like structures in which the dielectric constant varies periodically in space. The behavior of electromagnetic waves in photonic crystals may be analogized to that of electron waves in natural crystals. Analogous to a band gap in a semiconductor, if the contrast in dielectric constant is large enough in a photonic crystal, a "frequency gap" or "photonic band gap," may result, in which electromagnetic waves within the frequency gap are forbidden, irrespective of propagation direction. In other words, light or other electromagnetic radiation within the frequency gap cannot propagate, in any direction, within the crystal. Within the crystal, emission of photons at frequencies within the gap is thus prevented.

The potential for strict control of emission and propagation of light provides many potential applications in wide-ranging fields.

For example, since the decay rate of an excited atom or molecule is proportional to the density of photon states available for the transition, the frequency gap can be used to severely modify the lifetimes of excited chemical species situated within the photonic crystal. Immersing an excited atom or molecule in a photonic band gap material can increase or decrease the density of photon states available for the transition, thus enhancing or suppressing the decay rate of the excited species. Such selective modification of excited species lifetime will be very useful in photocatalytic processes to increase yield and/or selectivity of desired reactions.

Other applications envisioned for suppression of spontaneous emission by photonic crystals include: (1) use in lasers (particularly semiconductor lasers) to increase efficiency or to control or limit modes; (2) use in forming single-mode LEDs (3) use in solar cells to increase efficiency; (4) use in optical communications to increase available bandwidth and (5) use in quantum-optical devices. Still other applications that have been foreseen include chromatography, host-guest systems, thermal and/or electric shields or insulators, porous electrodes or electrolytes, waveguides, antenna substrates or shields, optical filters and reflectors, and paint pigments. Applications to optical switching and optical computing may also be found.

While the potential applications for photonic crystals are many, they are difficult to make. Present fabrication methods are generally time consuming and expensive, not likely to accommodate commercial production, and not generally amenable to application on curved surfaces. Present methods include (1) use of microlithographic techniques for assembly of a periodic semiconductor structure and (2) use of a self-ordering colloidal suspension of monodisperse silica or polystyrene spheres to form a close-packed template for forming an ordered dielectric matrix.

Method (1), microlithographic fabrication, is relatively uneconomical, particularly for larger crystals.

Method (2), use of monodisperse spheres to form a close-packed template of such spheres, is economically attractive because monodisperse colloidal suspensions of silica or polystyrene can self-assemble into close-packed structures at optical length scales, with excellent long-range periodicity. But creation of photonic gaps utilizing such close-packed structures requires interconnected lower-index spheres in an interconnected dielectric background of higher index. Optimum photonic effects require a low filling ratio (20–30%) of the dielectric background. Thus the template structure—with lower-index material surrounding higher-index spheres—must be used to form a structure with the relative indices reversed in order to achieve the desired photonic crystal structure. Difficulty has arisen in achieving such reversal. While dielectric materials with periodic pores have been fabricated using sol-gel techniques to form a dielectric matrix around the spheres of the template, followed by removal of the spheres, such fabrication is difficult and time-consuming, and definitive evidence of a photonic band gap has not been detected in the resulting structures.

SUMMARY OF THE INVENTION

The present invention provides an efficient, reliable method for the formation of photonic crystals. Materials produced by the inventive methods have shown definitive evidence of a photonic band gap.

According to the present invention, rather than forming a close-packed template of microspheres then substituting a dielectric for the material in the spaces, an aqueous sol is formed of a ceramic material, such as a nano-crystalline dielectric particles, and monodisperse microspheres such as polymer spheres. The dielectric material is thus incorporated during formation of the close-packed structure. A semiconductor material may be substituted for the dielectric material, if desired.

The desired quantity of the dielectric material (in terms of volume fraction of solids) is calculated from the expected geometric structure such that it just fills the voids between the microspheres at a packing efficiency, for the dielectric particles, of approximately 50–60%, with allowance for shrinkage in both drying and firing. For the typical fcc (face-centered cubic) structure, the desired quantity of dielectric particulate material is about 26% of the total solids volume.

Excess particulate material will result in a spreading of the polymer spheres and an increase in the filling ratio. Excess polymer spheres will result in incomplete matrix development and possibly higher friability of the finished structure. The amount of water can be adjusted to change the viscosity of the sol and thereby affect the dynamics of the self-ordering process.

Surface modifying agents (e.g. deflocculants, dispersants) can be used to improve the dispersion characteristics of the sol and the ordering behavior thereof by minimizing agglomeration and settling of the dielectric or semiconductor particulates. The pH of the suspension can be altered to change the surface charge of both the particles and the polymer spheres, again affecting the ordering behavior.

As microspheres, polystyrene, carboxylate-modified polystyrene and styrene/divinylbenezene (SDVB), available from Seradyn, 1200 Madison Ave, Indianapolis, Ind., 46225, have been used by the inventors hereof. Any polymer that can be manufactured as a sphere with the appropriate size and size distribution characteristics and which is amenable to removal by pyrolysis or by chemical methods could potentially be used. For a photonic band gap at optical frequencies, sphere diameters should be between 200 nm and 2 µm, depending on the desired position of the band gap and the processing shrinkage. Uniform packing requires that the sphere diameters vary by less than 1%.

Any of a number of dielectric or semiconducting materials can be employed, provided that the dielectric or semiconducting material can be made with a sufficiently small particle size (from 10–80 nm depending upon the polymer sphere size used) such that thousands of particles can fit in a single void between polymer spheres. Also, it must be possible to disperse the particles. Example particulate dielectric or semiconductor materials include $TiO_2$, $Al_2O_3$, $SiO_2$, $ZrO_2$, and $MTiO_3$ where M is one or more rare earth metal ions.

The sol is deposited on a substrate and allowed to dry slowly, under controlled humidity conditions. The sample may be pressed in a cold isostatic press to increase the as-dried density and reduce stress cracks appearing during subsequent heat treatment. The sample is then calcined to burn off the polymer spheres, leaving air spheres in a dielectric or semiconductor matrix. Thin films with dimensions of about 10 mm by 2–3 mm can be reproducibly synthesized in about one day, in much shorter time than with previously known colloidal suspension techniques. The films have highly ordered domains extending from about 50–100 µm, exhibiting better short-range and long-range order than previous macroporous materials fabricated from colloidal suspensions.

The substrate may be glass (for ease of characterization of the film) or any substrate that can withstand the required processing temperatures, can be compatible with the thermal expansion of the dielectric solid, and is smooth enough for an even film deposition.

The drying step is preferably performed for a time in the range of about 10 hrs to about 40 hrs, desirably for about 24 hours, at a humidity in the range of about 70% to about 99%, desirably about 95%, and at a temperature in the range of about 60° F. to about 150° F., desirably about 76° F.

The pressing step is desirably performed by placing the sample, in a evacuated, sealed, latex bag, in an incompressible pressure-transmitting oil, then ramping up in 5 minutes to between 100–200 MPa, desirably, 170 MPa, holding for 2 minutes, then releasing pressure.

The calcination step is designed according to the components of the system. If the system includes a polymer steric repulsion agent (dispersant), then the heating rate must be slowed at the appropriate temperatures to allow for complete removal of that polymer, as well as the polymer spheres.

The calcination step desirably includes slowly heating the sample, at a rate of about 70–80° C./hr, to a calcination temperature in the range of about 500 to about 900, desirably about 520° C. The calcination temperature is then maintained for a time in the range of about 2 to about 10 hours, followed by cooling to room temperature at a rate of about 70–80° /C./hr.

Further features, objects, and advantages of the invention will be apparent from the detailed description which proceeds below with reference to the following figures:

DETAILED DESCRIPTION

Figure 1A:
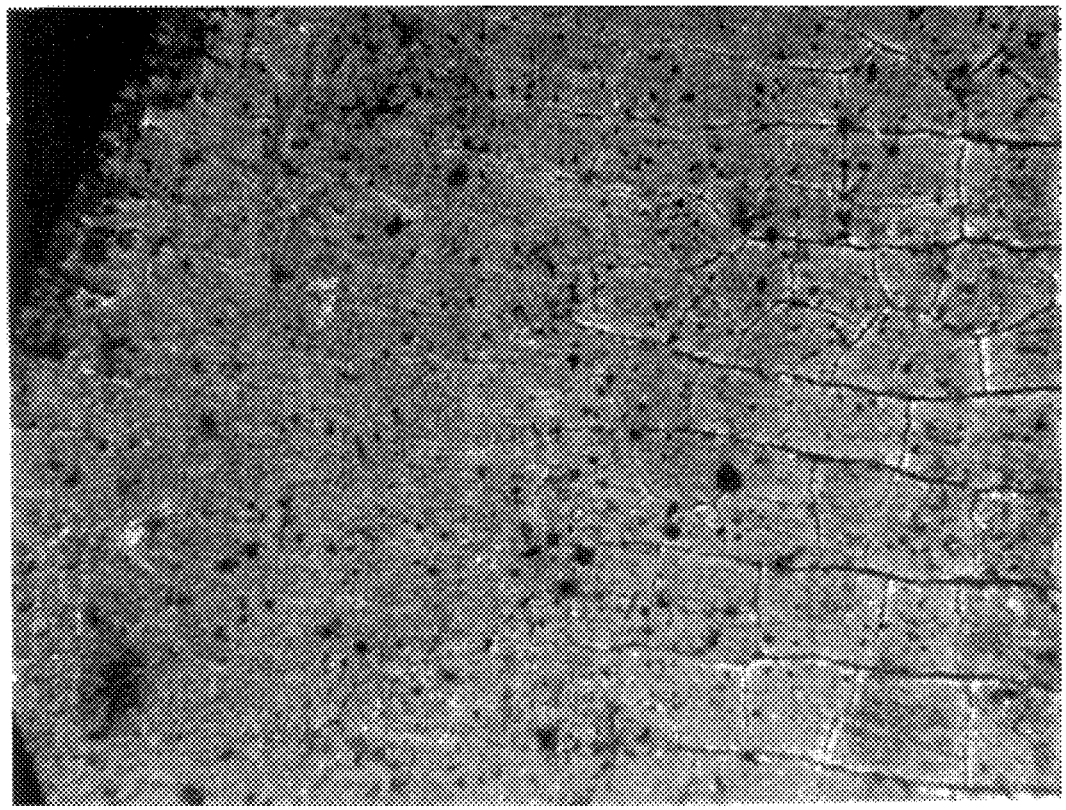
FIGS. 1a and 1b are optical images of respective photonic crystals created by the method of the present invention. The crystal of FIG. 1a was formed using microspheres having a diameter of 395 nm. The crystal of FIG. 1b was formed using microspheres having a diameter of 479 nm.

The present invention provides a quick, reliable and economical method for forming photonic crystals, that is, periodic dielectric structures exhibiting photonic band gaps.

First, a sol containing a nano-crystalline ceramic dielectric (or semiconductor) material and monodisperse polymer microspheres is formed. The desired quantity of the dielectric material (in terms of volume fraction of solids) is calculated from the expected geometric structure such that it just fills the voids between the microspheres at a packing efficiency, for the dielectric particles, of approximately 50–60%, with allowance for shrinkage in both drying and firing. For the typical fcc (face-centered cubic) structure, the desired quantity of dielectric particulate material is about 26% of the total solids volume. The suspension is ultrasonically disrupted to ensure proper dispersion. The solids loading of the suspension can be adjusted to modify the efficiency of packing and the thickness of the resulting films.

Next, a film of the sol is deposited on a substrate. The film is preferably slow-deposited through slow drying. The substrate is desirably chosen for one or more of the following qualities: any substrate that can withstand the required processing temperatures, be compatible with the thermal expansion of the dielectric solid, and is smooth enough for even film deposition. The substrate may additionally include or be shaped in the form of a mold configured to facilitate self-arranging and/or orienting of the microspheres in a desired close-packed order. The substrate may also have lines or other patterns etched in the surface thereof, in patterns similarly designed to enhance self-arranging and/or orienting of the microspheres in a desired close-packed order.

After the film is deposited, it is dried. Drying is desirably performed gradually, in a controlled humidity environment with relative humidity within the range of about 70% to about 99% and temperature in the range of about 60° F. to about 150° F. Drying time is desirably within the range of about 10 hrs to about 40 hrs, more specifically about 24 hours, or until 98% of the physical water is removed.

After the film is dried, it is desirably cold pressed in an isostatic press to increase its as-dried density. This has the effect of reducing cracking of the film due to stresses arising during subsequent thermal processing.

The film is then calcined to remove the polymer microspheres therefrom. Calcination is desirably performed at temperatures within the range of about 500° C. to about 900° C. for a time in the range of about 2 hr to about 10 hr. Ramp-up to calcination temperature is desirably gradual, at a rate of about 70–80° C./hr.

Working Examples

Titania, which has a refractive index of about 2.6 to about 2.8 at optical wavelengths, with negligible absorption above 400 nm, was used as the background dielectric filling medium. A sol was formed of nano-crystalline titania (Tri-K Industries, New Jersey, Micro-titanium dioxide—150 W, with a quoted particle size of 15 nm.) and monodisperse polystyrene spheres (Seradyn Inc., Indianapolis) to form a suspension. A few drops of this sol were dropped on a glass substrate to form a single sample and allowed to dry slowly over a period of about 24 hours in a humidity chamber. The sample was then pressed in a cold isostatic press to improve the initial density of the as-dried sample, and to reduce stress cracks during subsequent heat treatment. The sample was then slowly heated to 520° C. in 6 hours and held for 5 hours before ramping down to ambient in 6 hours, whereby the polystyrene spheres were burned off, leaving behind air spheres in a titania matrix. Thin films with dimensions~10 mm by 2–3 mm were reproducibly synthesized in this way in much shorter times (about one day) than with sol-gel infiltration techniques. Samples were prepared as above with microspheres of four different diameters: 395 nm, 479 nm, 556 nm, and 770 nm.

Figure 1B:
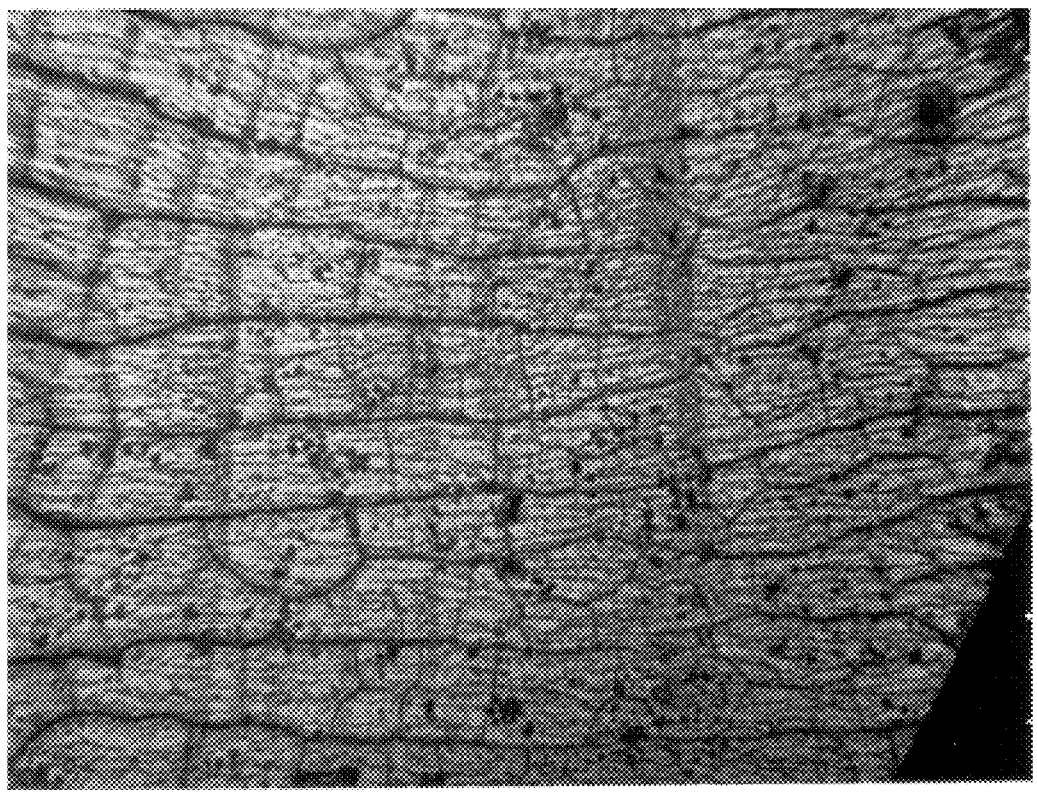

Optical inspection of the samples revealed shiny regions with characteristic colors that depend on the size of the polystyrene spheres used. This was especially clear when the samples were viewed under a microscope. Samples fabricated with 395 nm spheres exhibited bright green regions as shown in FIG. 1a. With larger spheres of 479 nm, the color shifted to a salmon-red color as shown in FIG. 1b. Unlike previous films, these films exhibit uniform color over large regions millimeters in size.

Figure 2:
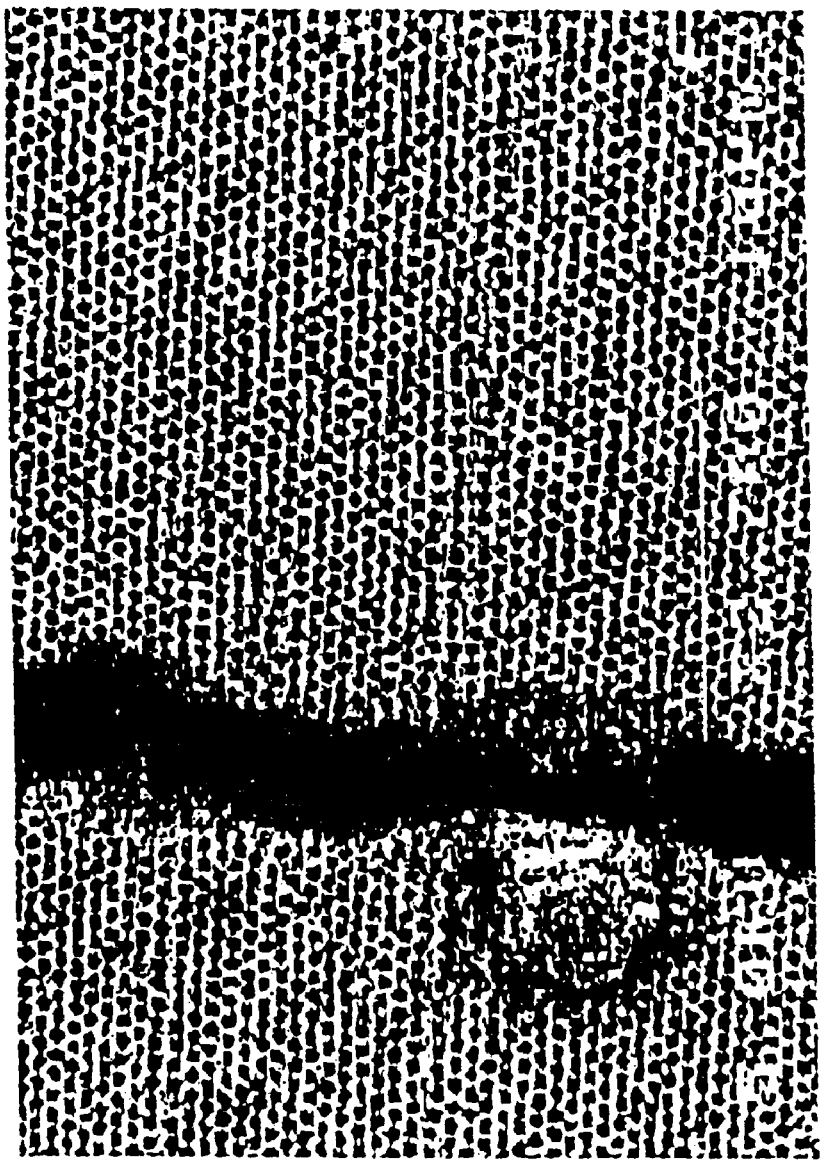
FIGS. 2a and 2b are scanning electron microscope (SEM) images of photonic crystals prepared according to the present invention.

As shown in FIG. 2a, wide-view scanning electron microscope (SEM) images show large domains with excellent order extending from about 50 μm to more than about 100 μm. (The micron bars on the micrograph of FIG. 2a show a 10 μm bar.) Also visible are single-height steps separating large domains of hexagonally-ordered regions. The domains are also well-ordered across drying cracks in the sample, indicating that ordering in the samples occurs upon deposition and is not disrupted by the drying and heating process. The crystals exhibit considerably better short-range and long-range order than the macroporous materials fabricated with sol-gel methods.

Figure 2B:
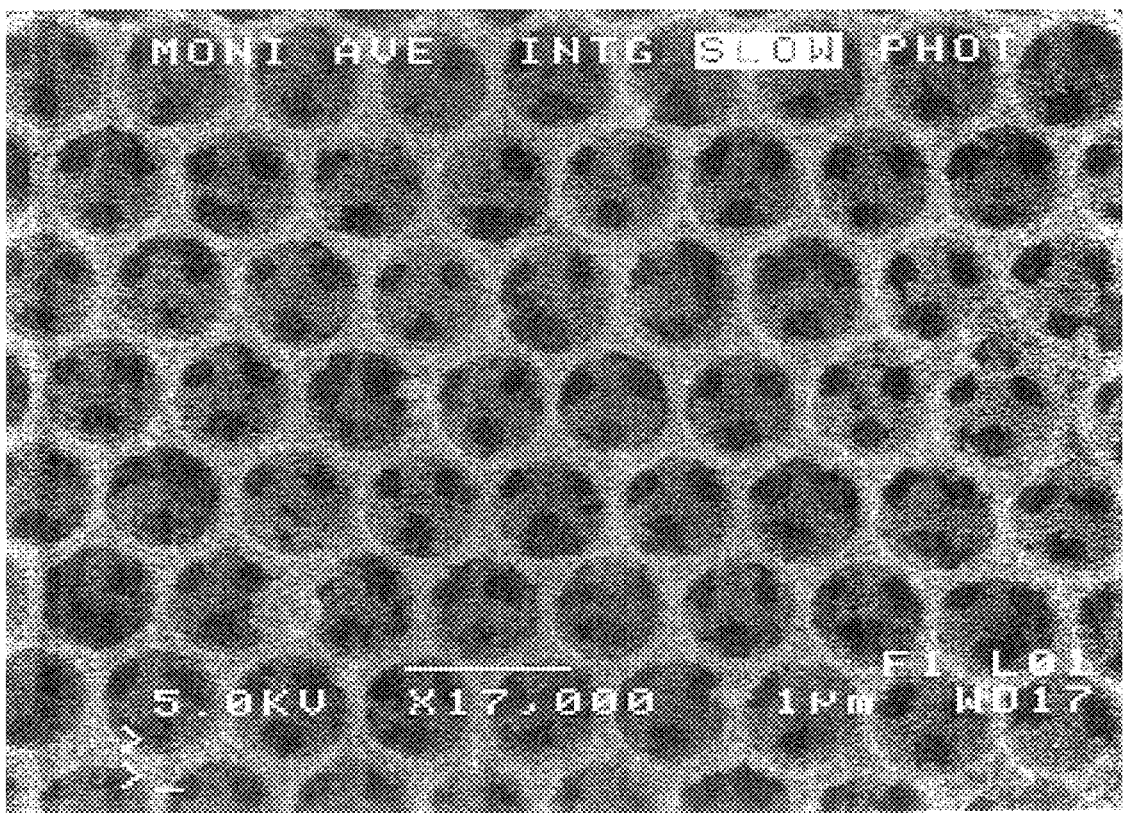

As shown in FIG. 2b (in which the micron bars show a 1 μm bar), higher magnification SEM images reveal hollow regions of air spheres that are very well ordered in a triangular lattice. There are three dark regions inside each hollow region corresponding to the air spheres of the underlying layer, indicating that the spheres are indeed close-packed. The SEM images indicate that the crystalline grains in the film are highly oriented with the close-packed planes parallel to the substrate. Preferential orientation also exists in the close-packed plane probably due to stresses developing during the drying process. This alignment of crystal grains may prove very useful for applications and measurements, especially in cases where a full photonic band gap does not exist in all directions of propagation in the crystal.

Determination of the lattice constant indicates a shrinkage of 5% or less in the lateral direction of the film due to the heat treatment and consequent densification of the titania network. Experimental thickness measurements, before and after the pressing and heating process, indicate a larger shrinkage in the direction perpendicular to the film.

Figure 3:
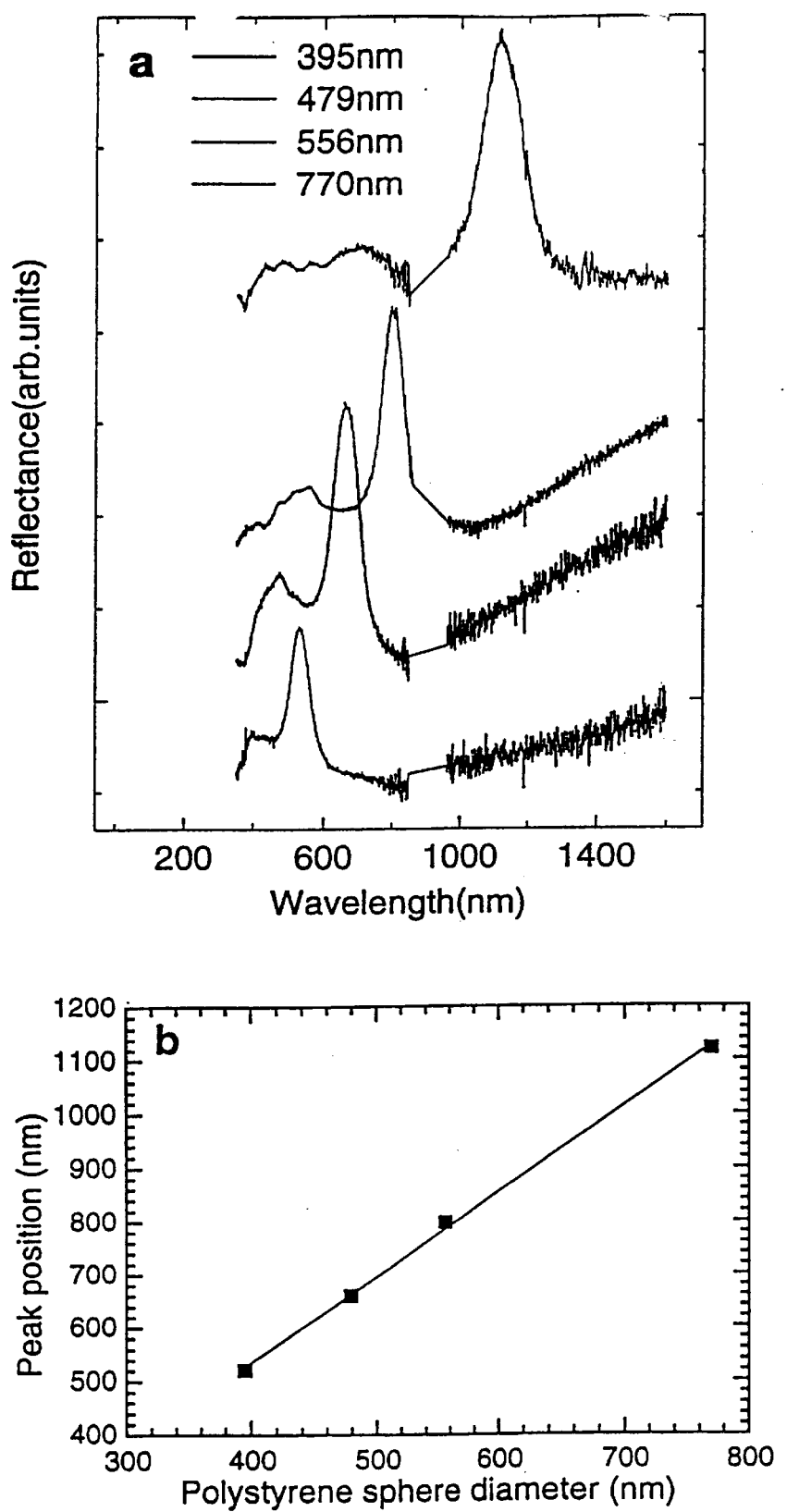
FIGS. 3a is a computer-generated plot of specular reflectance for each of four different photonic crystals formed with microspheres of the indicated diameters.
FIG. 3b is a computer-generated plot of the observed reflectance peak of the four photonic crystals of FIG. 3a as a function of microsphere diameter.

Since the ordered films have a thickness of 10 μm or greater, their transmission of light is relatively low, and the major optical signature is found in reflectance measurements. The specular reflectance at near normal incidence from the films is shown in FIG. 3a for different sizes of polystyrene spheres as templates. The initial sphere sizes given in the legend were measured directly from SEM images of ordered arrays of polystyrene spheres.

The prominent feature is a specular reflectivity peak, for each structure, that systematically shifts from 1120 nm to 521 nm over the range of the photonic crystals. The wavelength of the specular peak corresponds very well to the visual color of the samples. The larger pore samples have reflectivity peaks in the near-infrared. In addition, there is a gradual but featureless increase in reflectivity at longer wavelengths (above 1000 nm) in several samples. This is due to the rough surface of the crystals appearing smoother when probed at longer wavelengths. This increases the specular reflectivity, with an accompanying decrease of the diffuse reflectance at longer wavelength, which is also observed.

The position of the observed reflectivity peak scales remarkably well with the diameter of the spheres, as shown in FIG. 3b, indicating that the peak position is an intrinsic feature of the photonic crystals. This is the first observation of the optical signature of a photonic crystal together with the required scaling with sphere size. These two effects, together a strong indication of predicted photonic band gap effects, have not been seen in any previous work on templated photonic crystals.

Photonic band calculations and calculated reflectivities from transfer matrix simulations find that the peak arises from the wide stop band in the stacking direction for close-packed structures. For the fcc structure, this corresponds to the stop band between the lowest bands 2 and 3. These calculations find that the existence and position of the stop band in the stacking direction are insensitive to the stacking sequence of the spheres (fcc (ABC) or hcp (ABAB)). The stop band corresponds to the known pseudogap in the photonic densities of states, and persists even for lower indexes (in the neighborhood of 2), over a large range of filling fractions.

To obtain the refractive index of the titania in the photonic crystals, the density of solid titania films formed under similar processing conditions was measured. These were found to have a density of about 70% of the bulk value, leading to an estimated value of n of about 1.9 for the titania in the crystal structures. The refractive index of the titania in the crystal structures may be improved by sintering at higher temperatures, desirably in the range of about 600° C. to about 1000° C. Quantitative calculations of peak wavelengths have not yet been made, but preliminary estimates indicate that the observed peak frequencies are consistent with what is known about the geometry and filling fraction of the films.

The present invention provides or the fabrication of large-area optical photonic crystals using rapid, economical, and reproducible ceramic techniques. This will open the way towards the experimental observation of many interesting effects involving the control of light emission and propagation in these materials, as well as many interesting potential applications.

While the invention is particularly described herein with reference to specific working embodiments, these embodiments serve as examples only, and the invention is applicable to fabrication of varying photonic band gap materials. For example, the methods disclosed herein could be applied to binary systems (systems using two sizes of spheres) or systems employing pore-defining micro-particles of other than spherical shape. The full scope of the invention is defined by the claims below.

We claim:

1. A method for forming a periodic dielectric structure exhibiting photonic band gap effects, the method comprising:

forming a sol of a ceramic material and monodisperse polymer microspheres;

depositing a film of the sol on a substrate;

drying the film;

calcining the film to remove the polymer microspheres therefrom, leaving a solid matrix of the ceramic material, having therein periodically arranged air spheres, wherein the ceramic material is selected from the group consisting of nano-crystalline ceramic dielectric or semiconductor material.

2. The method of claim 1 further comprising the step of cold-pressing the film after drying and before calcining to increase the as-dried density of the film.

3. The method of claim 1 wherein the substrate comprises a mold in which the film is deposited, the mold having a shape that promotes assembly of the microspheres into a desired close-packed structure.

4. The method of claim 3 wherein the desired close-packed structure a face-centerd cubic structure.

5. The method of claim 1 wherein the substrate comprises a template onto which the film is deposited, the template having a shape that promotes assembly of the microspheres into a desired close-packed structure.

6. The method of claim 1 wherein the nano-crystalline dielectric or semiconductor material comprises material having a sufficiently small particle size such that thousands of particles can fit in a single void between the polymer microspheres.

7. The method of claim 1 wherein the nano-crystalline dielectric material comprises one of $TiO_2$, $Al_2O_3$, $SiO_2$, $ZrO_2$, and $MTiO_3$, where M is one of (1) one or more rare-earth metal ions, and (2) a semiconducting material such as silicon.

8. The method of claim 1 wherein the polymer microspheres are selected to have a mean diameter within the range of about 200 nm to about 2 $\mu$m, with a deviation from the mean of not more than 1%.

9. The method of claim 1 wherein the polymer microspheres comprise polystyrene microspheres.

10. The method of claim 1 wherein the sol is an aqueous sol and wherein the step of drying the film comprises drying the film under controlled humidity conditions with a relative humidity in the range of about 50% to about 99% and at a temperature in the range of about 16° C. to about 66° C.

11. The method of claim 10 wherein the step of drying the film further comprises drying the film for a time in the range of about 10 to about 40 hours.

12. The method of claim 1 wherein the step of calcining the film comprises calcining the film at a temperature in the range of about 500° C. to about 900° C.

13. The method of claim 1 wherein the slurry further comprises surface-active agents to modify the charge on the particle and polymer sphere surfaces.

14. A periodic dielectric structure exhibiting photonic band gap effects formed by the process comprising:

forming a sol of a ceramic material and monodisperse polymer microspheres;

depositing a film of the sol on a substrate;

drying the film;

calcining the film to remove the polymer microspheres therefrom, leaving a solid matrix of the ceramic material, having therein periodically arranged air spheres, wherein the ceramic material is selected from the group consisting of nano-crystalline ceramic dielectric or semiconductor material.

* * * * *